United States Patent [19]

Hunter et al.

[11] 4,175,200
[45] Nov. 20, 1979

[54] N,N-DISUBSTITUTED SULFONYL HYDRAZINES

[75] Inventors: Byron A. Hunter, Woodbridge; Franklin H. Barrows, Beacon Falls, both of Conn.

[73] Assignee: Uniroyal, Inc., New York, N.Y.

[21] Appl. No.: 789,484

[22] Filed: Apr. 21, 1977

Related U.S. Application Data

[60] Division of Ser. No. 638,474, Dec. 8, 1975, abandoned, which is a continuation-in-part of Ser. No. 567,169, Apr. 11, 1975, abandoned.

[51] Int. Cl.² .............. C07C 143/825; C07C 143/83; C07C 143/833
[52] U.S. Cl. .......................................... 560/1; 560/13; 560/137; 560/115; 560/148; 260/554
[58] Field of Search ................ 560/13, 1, 135, 137, 560/148, 115, 133

[56] References Cited

U.S. PATENT DOCUMENTS

| | | | |
|---|---|---|---|
| 3,185,677 | 5/1965 | Davis | 560/13 |
| 3,799,760 | 3/1974 | Stephens | 560/13 |
| 3,925,270 | 12/1975 | Hunter | 560/13 |

OTHER PUBLICATIONS

Munshi, Current Science, No. 11, pp. 283–284 (1966).
Cremlyn, J. Chem. Soc. (c), pp. 2629–2630 (1970).
Herweh, J. Org. Chem., 41, pp. 116–122 (1976).

*Primary Examiner*—James O. Thomas, Jr.
*Assistant Examiner*—Michael L. Shippen
*Attorney, Agent, or Firm*—James J. Long

[57] ABSTRACT

N,N'-disubstituted sulfonyl hydrazine with the following structural formula are disclosed:

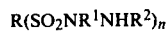

$$R(SO_2NR^1NHR^2)_n$$

wherein the $R^1$ and $R^2$ groups are the same or different and are either $-COOR^3$ or $-CONHR^4$. These novel compounds are useful as high temperature blowing agents for gas-expandable polymers.

6 Claims, No Drawings

N,N-DISUBSTITUTED SULFONYL HYDRAZINES

This is a division of application Ser. No. 638,474 filed Dec. 8, 1975, now abandoned; which in turn is a continuation-in-part of application Ser. No. 567,169, filed Apr. 11, 1975, now abandoned.

This invention relates to novel N,N'-disubstituted sulfonyl hydrazines as well as their use in the art of manufacturing cellular polymeric materials. The disubstituted sulfonyl hydrazines have been found useful as chemical blowing agents in the expansion of polymers. The chemicals of the invention are particularly valuable in the expansion of gas expandable polymers such as elastomers and plastics which are normally processed at elevated temperatures and especially in plastics which are processed at temperatures above 225° C., or even at temperatures in excess of 250° C.

The N,N'-disubstituted sulfonyl hydrazines of this invention have the structural formula

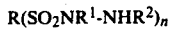

wherein R is a hydrocarbyl group further described hereafter, the $R^1$ and $R^2$ groups are the same or different and are either —$COOR^3$ or —$CONHR^4$, and n is an integer having a value of 1 or 2.

The use of certain monofunctional aryl sulfonyl carbazates of the structure

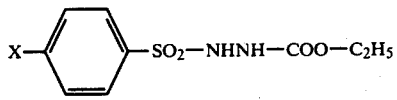

where X is H, —$CH_3$, —$OCH_3$, $CH_3$—CO—NH—, Cl, Br, or $NO_2$ in medicinal preparations, as wetting and lubricating agents, in the textile industry, in the dye industry, as herbicides, and as sedatives has been known from such articles as Zhurnal Organicheskoi Khimii, Vol. 7. No. 4, pp. 794–798, April 1971, J. Chemical Society (c) 1970 (org.) 2629, and Current Science #11, 1966, p. 283–4. However, none of these references has any suggestion of the usefulness of these compounds as blowing agents, nor is there any suggestion or disclosure of the N,N'-disubstituted sulfonyl hydrazines of this invention.

Blowing agents which decompose at relatively high temperatures are not new. U.S. Pat. No. 3,235,519 discloses the use of sulfonyl semicarbazides which decompose at above 170° C. as blowing agents for polymeric materials. These blowing agents are particularly suitable for expanding high density polyethylenes, and many other rubbery and plastic polymers, but upon decomposition, they produce ammonia which tends both to attack polymeric materials such as polycarbonates and polyesters, and to react with certain metals used for the construction of molding equipment.

This invention provides a new class of blowing agents which decompose non-explosively, and controllably at high temperatures and are valuable in the expansion of polymers such as elastomers and plastics which are normally processed at the high temperatures, i.e. in plastics which are processed at temperatures above 225° C. Some chemicals of the invention are useful at expansion temperatures in excess of 250° C.

The invention also provides novel N,N'-disubstituted sulfonyl hydrazines wherein the substituents are the same or different and are either —$COOR^3$ or —$COHNR^4$. Furthermore, methods for making these new compounds are provided.

The N,N'-disubstituted sulfonyl hydrazines of this invention contain at least one

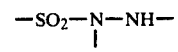

moiety per molecule, wherein the sulfur and the two nitrogen atoms are each bonded to various organic groups, as shown below.

These compounds have the following structural formula

wherein R is a hydrocarbyl radical and may be an alkyl radical having 1 to 12 carbon atoms, preferably 1 to 4 carbon atoms, an aryl radical having 6 to 12 carbon atoms, preferably 6 to 10 carbon atoms; an aralkyl or alkaryl radical having 7 to 12 carbon atoms, preferably aralkyl having 7 to 9 carbon atoms and alkaryl having 7 to 10 carbon atoms; a cycloalkyl radical having 5 to 9 carbon atoms, preferably 5 to 6 carbon atoms; or a group of the structure —$R^5$—A—$R^6$— wherein A is a single bond connecting $R^5$ and $R^6$ or is —O—, —S—, —SO—, —$SO_2$—, usually a single bond or —O—; or A is an alkylene radical having from 1 to 6 carbon atoms such as methylene, ethylene, propylene, tetramethylene and hexamethylene, or an alkylidene radical having 2 to 3 carbon atoms such as ethylidene and isopropylidene; and $R^5$ and $R^6$ may be the same or different and are alkylene having 1 to 4 carbons atoms or phenylene; and wherein the $R^1$ and $R^2$ groups are the same or different and are either —$COOR^3$ or —$CONHR^4$, wherein $R^3$ is a hydrocarbyl radical and may be alkyl having 1 to 12 carbon atoms, cycloalkyl having 5 to 9 carbon atoms, aryl having 6 to 12 carbon atoms, alkaryl or aralkyl having 7 to 12 carbon atoms and $R^4$ is either hydrogen or is selected from the same hydrocarbyl group as $R^3$. "n" is an integer having the value 1 or 2.

Preferably, each $R^3$ is an alkyl group with 1 to 8 carbon atoms, cycloalkyl with 5 to 6 carbon atoms, aryl with 6 to 10 carbon atoms, alkaryl with 7 to 9 carbon atoms, and aralkyl with 7 to 8 carbon atoms. Most preferably, each $R^3$ is isopropyl, sec-butyl, tert-butyl, cyclohexyl, benzyl, phenyl, or tolyl.

Preferably, $R^4$ is hydrogen or the same preferable compounds from which $R^3$ is selected. Most preferably, $R^4$ is hydrogen, isopropyl, sec-butyl, tert-butyl, cyclohexyl, benzyl, phenyl, or tolyl.

Examples of the new compounds are given in the following listings as well as in the examples below:
  (a) Both substituents being —$COOR^3$
    1-Benzenesulfonyl-1,2-dicarbomethoxy hydrazine
    1-Benzenesulfonyl-1,2-dicarbethoxy hydrazine
    1-Benzenesulfonyl-1,2-dicarbo-n-propoxy hydrazine
    1-Benzenesulfonyl-1,2-dicarbo-n-butoxy hydrazine
    1-Benzenesulfonyl-1,2-dicarbo-sec-butoxy hydrazine
    1-Benzenesulfonyl-1,2-dicarbisobutoxy hydrazine
    1-Benzenesulfonyl-1-carbisopropoxy-2-carbophenoxy hydrazine
    1-p-Toluenesulfonyl-1-carbophenoxy-2-carbisopropoxy hydrazine
    1-p-Toluenesulfonyl-1-carbisopropoxy-2-carbophenoxy hydrazine 1,2-dicarbomethoxy-1-methanesulfonyl hydrazine
1,2-dicarbisopropoxy-1-methanesulfonyl hydrazine
1,2-dicarbisopropoxy-1-ethanesulfonyl hydrazine
1,2-dicarbo-sec-butoxy-1-ethanesulfonyl hydrazine
1,2-dicarbisopropoxy-1-butanesulfonyl hydrazine
1,2-dicarbomethoxy-1-hexanesulfonyl hydrazine
1-carbomethoxy-2-carboisopropoxy-1-methanesulfonyl hydrazine
1-carbisopropoxy-2-carbo-sec-butoxy-1-butanesulfonyl hydrazine
1,2-dicarbomethoxy-1-cyclohexanesulfonyl hydrazine
1,2-dicarbisopropoxy-1-cyclohexanesulfonyl hydrazine
1-carbethoxy-2-carbo-sec-butoxy-1-cyclohexanesulfonyl hydrazine
1,2-dicarbisopropoxy-2-toluenesulfonyl hydrazine
Ethane-1,2-bis(1-sulfonyl-1,2-dicarbisopropoxy hydrazine)
Butane-1,4-bis(1-sulfonyl-1,2-dicarb-sec-butoxy hydrazine)
4,4'-Biphenylenebis(1-sulfonyl-1,2-dicarbo-sec-butoxy hydrazine)
4,4'-Oxybis(1-benzenesulfonyl-1,2-dicarbomethoxy hydrazine)
Oxybis(1-ethane sulfonyl-1,2-dicarbisopropoxy hydrazine)
Sulfonyl bis(1-ethane sulfonyl-1,2-dicarbomethoxy hydrazine)
1,2-dicarbocyclohexyloxy-1-methanesulfonyl hydrazine
1,2-dicarbo-α-tolyloxy-1-butanesulfonyl hydrazine
1,2-dicarbophenoxy-1-methanesulfonyl hydrazine
1-carboamyloxy-2-carbisopropoxy-1-p-toluenesulfonyl hydrazine
1-carbododecyloxy-2-carbomethoxy-1-benzenesulfonyl hydrazine
1-carbisopropoxy-2-tert-butoxy-p-toluenesulfonyl hydrazine
1-carbomethoxy-2-carbisopropoxy-1-p-tert-butyl benzenesulfonyl hydrazine
1,2-diisopropyl-1-(2,4-dimethylbenzenesulfonyl) hydrazine
4,4'-Oxybis(1-benzenesulfonyl-1,2-dicarbisopropoxy hydrazine)
1,3-Dimethylbenzene-4,6-bis(1-sulfonyl-1,2-dicarbomethoxy hydrazine)
(b) $R^1$ being —COOR$^3$ and $R^2$ being —CONHR$^4$
1-Benzenesulfonyl-1-carbomethoxy-2-carbamyl hydrazine
1-Benzenesulfonyl-1-carbethoxy-2-carbamyl hydrazine
1-Benzenesulfonyl-1-carbo-tert-butoxy-2-carbamyl hydrazine
1-p-Chlorobenzenesulfonyl-1-carbisopropoxy-2-carbamyl hydrazine
1-(2,3,5-Trichlorobenzenesulfonyl)-1-carbisopropoxy-2-carbamyl hydrazine
1,3-Benzenebis(1-sulfonyl-1-carbisopropoxy-2-carbamyl hydrazine)
1,4-Butylenebis(1-oxycarbonyl-1-p-toluenesulfonyl-2-carbamyl hydrazine)
4,4'-Oxybis(1-benzenesulfonyl-1-carbisopropoxy-2-carbamyl hydrazine)
1,4-Butanebis(1-sulfonyl-1-carbomethoxy-2-carbamyl hydrazine)
1-Methanesulfonyl-1-carbomethoxy-2-carbamyl hydrazine
1-Ethanesulfonyl-1-carbisopropoxy-2-carbamyl hydrazine
1-Cyclopentanesulfonyl-1-carbisopropoxy-2-carbamyl hydrazine
1-Cyclohexanesulfonyl-1-carbethoxy-2-carbamyl hydrazine
1-Cyclooctanesulfonyl-1-carbisopropoxy-2-carbamyl hydrazine
1-carbisopropoxy-2-carbamyl-1-methanesulfonyl hydrazine
1-carbomethoxy-2-isopropylcarbamyl-1-methanesulfonyl hydrazine
1-carbisopropoxy-2-carbamyl-1-ethanesulfonyl hydrazine
1-carbo-sec-butoxy-2-(phenylcarbamyl)-1-butanesulfonyl hydrazine
1-carbocyclohexyloxy-2-ethylcarbamyl-1-hexanesulfonyl hydrazine
1-carbophenoxy-2-cyclohexylcarbamyl-1-ethanesulfonyl hydrazine
1-carbo-α-tolyloxy-2-carbamylmethanesulfonyl hydrazine
1-carbisopropoxy-2-dodecylcarbamyl-1-benzenesulfonyl hydrazine
1-carbo-sec-butoxy-2-cyclohexylcarbamyl-p-toluenesulfonyl hydrazine
1-carbisopropoxy-2-benzylcarbamylbenzenesulfonyl hydrazine
p,p'-oxybis(1-benzenesulfonyl-1-carbisoproposy-2-ethylcarbamyl hydrazine)
4,4'-biphenylene bis(1-sulfonyl-1-carbomethoxy-2-methylcarbamyl hydrazine)
(c) $R^1$ being —CONHR$^4$ and $R^2$ being —COOR$^3$
1-Benzenesulfonyl-1-ethylcarbamyl-2-carbisopropoxy hydrazine
1-Benzenesulfonyl-1-methylcarbamyl-2-carbo-tert-butoxy hydrazine
1-p-Chlorobenzenesulfonyl-1-benzylcarbamyl-2-carbomethoxy hydrazine
1-n-Butanesulfonyl-1-n-propylcarbamyl-2-carbo-sec-butoxy hydrazine
1-Cyclohexylsulfonyl-1-phenylcarbamyl-2-carbethoxy hydrazine
1-p-Toluenesulfonyl-1-isopropylcarbamyl-2-carbisopropoxy hydrazine
Ethane-1,2-bis(1-sulfonyl-1-ethylcarbamyl-2-carbomethoxy hydrazine)
4,4'-biphenylene bis(1-sulfonyl-1-methylcarbamyl-2-carbethoxy hydrazine)
1-Hexanesulfonyl-1-sec-butylcarbamyl-2-carbisopropoxy hydrazine
4,4'-Oxybis(1-benzenesulfonyl-1-tert-butylcarbamyl-2-carbomethoxy hydrazine)
1,4-Butylenebis(1-p-toluenesulfonyl-1-methylcarbamyl-2-oxycarbonyl hydrazine)
(d) Both substituents —CONHR$^4$
1-Benzenesulfonyl-1,2-dicarbamyl hydrazine
1-p-Toluenesulfonyl-1,2-dicarbamyl hydrazine
1-n-Butanesulfonyl-1,2-dicarbamyl hydrazine
1-Cyclohexanesulfonyl-1,2-dicarbamyl hydrazine
1-Methanesulfonyl-1,2-diphenylcarbamyl hydrazine
1-Methanesulfonyl-1,2-di(methylcarbamyl) hydrazine
1-Ethanesulfonyl-1,2-di(ethylcarbamyl)hydrazine
1-Butanesulfonyl-1,2-dicarbamyl hydrazine
1-Cyclohexylsulfonyl-1,2-di(methylcarbamyl hydrazine)
1-α-Toluenesulfonyl-1,2-dicarbamyl hydrazine 1-Dodecanesulfonyl-1,2-dicarbamyl hydrazine
1-Dodecanesulfonyl-1,2-di(ethylcarbamyl) hydrazine
Oxybis(1-ethanesulfonyl-1,2-dicarbamyl hydrazine)

The N,N'-disubstituted sulfonyl hydrazines can be made in a variety of ways depending upon the available starting materials. All of the methods essentially involve the replacement of the active hydrogens in the —SO$_2$NH—NH$_2$ or —SO$_2$NH—NHR$^2$ moieties of the starting materials with haloformates, or the reaction of a compound of the structural formula R$^3$OOCN=NCOOR$^3$ or R$^4$NHCON=NCONHR$^4$ with a sulfinic acid.

Method I:

The preparation of N,N'-dicarboxylate sulfonyl hydrazines may be accomplished according to the equation:

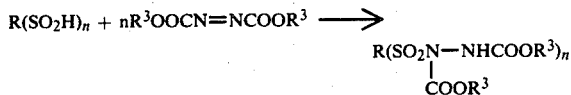

$$R(SO_2H)_n + nR^3OOCN=NCOOR^3 \longrightarrow$$
$$R(SO_2N-NHCOOR^3)_n$$
$$\phantom{R(SO_2N-NHC}|\phantom{OOR^3)_n}$$
$$\phantom{R(SO_2N-NH}COOR^3$$

wherein R, R$^3$ and n have the previously defined meanings.

In this case, a metal (e.g. sodium or zinc) sulfinate is charged to a reactor to form a solution or a slurry in water. For good agitation and heat transfer one may use from 200 to 4000 ml. of water per mole of anticipated end product, generally from 500 to 1500 ml. of water per mole is conveniently used. In order to form the free sulfinic acid, a sufficient amount of an appropriate mineral acid such as sulfuric acid or hydrochloric acid is introduced during the agitation. Alternatively sulfinic acid may be used for the sulfinate and then no addition of a mineral acid is necessary. To the free sulfinic acid is then added an equivalent or about up to 10 percent less than the equivalent amount of the azodiester. The use of more than the stoichiometric amount of the azodiester is preferably avoided due to the insufficient conversion to the desired compound as well as contaminations and discoloration of the final product by the unreacted diester.

The azodiester may be charged all at once. However, since the reaction is somewhat exothermic, it is advisable to introduce the azodiester gradually or incrementally in order to keep the reaction mixture within a desirable temperature range. Heating or cooling may be applied if necessary in order to maintain the reaction temperature between about 10° and 90° C. The reaction has been observed to proceed well between 25° and 75° C. with good product yields. The reaction may last from about 30 minutes to 20 hours, though usually reaction periods of from 1 to 4 hours are sufficient. Disappearance of the yellowish color of the azodiester starting ingredient provides a good visual indication of completion of the reaction.

The isolation of the product, usually a crystalline material is readily accomplished by filtration of the reaction mixture. The material may then be washed several times with water and recrystallized from a suitable aliphatic solvent such as pentane, hexane, petroleum naphtha, and the like. If the product is an oily or viscous liquid, it may first be dissolved with a preferably aromatic solvent such as benzene or toluene and, after decantation of the aqueous layer, the solvent is removed by evaporation. Subsequent treatment with one of the aliphatic solvents usually causes crystallization of the product. In a very few instances, it has been observed that crystallization proceeds very slowly. However, even as viscous liquids, the compounds of this invention are useful high temperature blowing agents.

METHOD II:

Another process for the production of N,N'-dicarboxylate sulfonyl hydrazines is shown by the equation

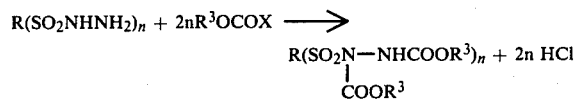

$$R(SO_2NHNH_2)_n + 2nR^3OCOX \longrightarrow$$
$$R(SO_2N-NHCOOR^3)_n + 2n \text{ HCl}$$
$$\phantom{R(SO_2N-NH}|\phantom{COOR^3)}$$
$$\phantom{R(SO_2N-NH}COOR^3$$

wherein R, R$^3$ and n have the above meanings, and X is bromine or chlorine.

In this process the sulfonyl hydrazide is introduced into a suitable reactor containing, in an amount as specified in Method I, a liquid carrier such as water, methanol, ethanol, isopropanol, tetrahydrofuran (THF), dimethylformamide (DMF), acetonitrile, ethylene dichloride or trichloroethylene. To the resultant solution (if for instance THF is used) or suspension (if water is the medium) a base is added such as sodium or potassium hydroxide or sodium or potassium carbonate or bicarbonate in an amount about equivalent to the active hydrogens present. The haloformate is then gradually introduced while agitating the reaction mixture. Generally the addition of the haloformate takes from about 30 minutes to 3 hours after which time the reaction is continued, usually not more than 20 hours. The reaction temperature is conveniently held within the limits indicated in Method I by suitable means. As in the previous method, in most cases the resultant product is obtained as a crystalline material which may be further purified and recrystallized as described in Method I previously. Alternatively, the order of addition may be reversed with the haloformate being charged first, and then the sulfonyl hydrazide with the base may be charged.

METHOD III.

The preparation of the N,N'-dicarboxylate sulfonyl hydrazines may be in accordance with the equation

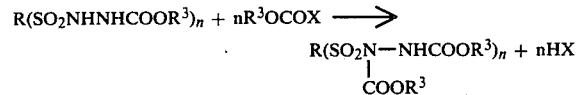

$$R(SO_2NHNHCOOR^3)_n + nR^3OCOX \longrightarrow$$
$$R(SO_2N-NHCOOR^3)_n + nHX$$
$$\phantom{R(SO_2N-NH}|\phantom{COOR^3)}$$
$$\phantom{R(SO_2N-NH}COOR^3$$

wherein R, R$^3$, n and X have the same meanings as in Method II and the R$^3$ groups may be the same or different. This reaction is conducted as described for Method II except that a sulfonyl carbazate is employed instead of the sulfonyl hydrazide.

METHOD IV.

The production of N-carboxylate-N'-carbamyl sulfonyl hydrazines may proceed according to the equation

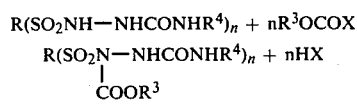

$$R(SO_2NH-NHCONHR^4)_n + nR^3OCOX$$
$$R(SO_2N-NHCONHR^4)_n + nHX$$
$$\phantom{R(SO_2N-N}|\phantom{HCONHR^4)}$$
$$\phantom{R(SO_2N-N}COOR^3$$

wherein R, $R^3$, $R^4$, n and X have the meanings described above. This reaction is substantilly carried out according to the procedure of Method II except that instead of the sulfonyl hydrazide a sulfonyl semicarbazide is used as the starting material.

METHOD V.

The preparation of N-carbamyl-N'-carboxylate sulfonyl hydrazines may proceed according to the equation

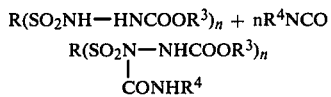

wherein R, $R^3$, $R^4$ and n have the meanings described above except that $R^4$ may not be hydrogen. This reaction is carried out substantially according to the procedure of Method III except that (1) an isocyanate is employed instead of the haloformate as a starting material; (2) the isocyanate addition may occur in from about 5 minutes to 3 hours or longer; and (3) any non-OH-containing solvent may be used as the liquid carrier, such as benzene, toluene, dioxane, dimethylformamide, dibutylether, tetrahydrofuran, and trichloroethylene.

METHOD VI.

The preparation of N-carbamyl-N'-carboxylate sulfonyl hydrazines may also proceed according to the equation

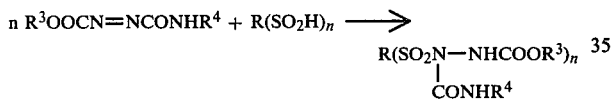

wherein R, $R^3$, $R^4$ and n have the meanings described above, preferably $R^4$ is not hydrogen. This reaction is substantially carried out as Method I except that 1-carboxylate-2-carbonamide-diimide is used instead of the azodicarboxylic acid ester. Use of this method also produces some of the isomeric N-carboxylate-N'-carbamyl sulfonyl hydrazines of the structure

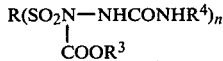

This product is readily separated from the N-carbamyl-N'-carboxylate sulfonyl hydrazines due to differences in melting points.

METHOD VII.

A process for the preparation of N,N'-dicarbamyl sulfonyl hydrazines is according to the equation

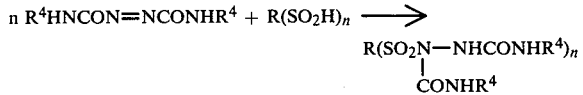

wherein the terms R, $R^4$ and n have the above meanings. The $R^4$ groups may be the same or different. This reaction may be conducted essentially as Method I except that an azodicarbonamide is used instead of the azodicarboxylic acid ester.

The above methods readily yield the desired compounds of this invention including bis(sulfonyl hydrazines) having the desired substituents attached to the N and N' atoms.

In addition certain bis-compounds wherein the esterifying group of the haloformate is divalent may be obtained by a reaction following the scheme

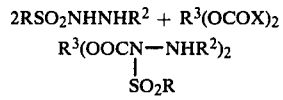

wherein R, $R^2$, $R^3$ and X have the above meanings, following the general procedure of Method II using a hydrocarbylbis(haloformate).

Other bis-compounds well within the teaching of this invention are obtained in accordance with the equation

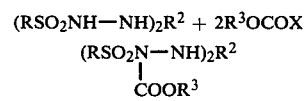

wherein R, $R^2$, $R^3$ and X have the above assigned meanings and the $R^3$ or $R^4$ substituents of the $R^2$ divalent group are $—R^5—A—R^6—$ as previously defined or together form a methylenebiscyclohexyl radical. The general Method II also applies here, but instead of a hydrocarbylbis(sulfonyl semicarbazide) or -bis(sulfonyl carbazate) compounds of the formulas $$(RSO_2NHNHCOO)R^5AR^6(OOCNHNHSO_2R),$$

or $$(RSO_2NHNHCONH)R^5R^6(HNCONHNHSO_2R)$$

are employed with the haloformate.

Furthermore, this invention also includes polymeric compounds based on starting materials both of which have difunctionality, i.e. obtained by the reaction of a hydrocarbylbis(haloformate) and a hydrocarbylbis(sulfonyl semicarbazide) or a hydrocarbylbis (sulfonyl carbazate). The resultant oligomeric or polymeric compounds have improved stability towards sublimation and have a reduced tendency to migrate with time to the surface of the polymers being expanded.

Any of the above methods may readily be conducted at atmospheric pressure, and higher or lower pressures are not necessary though they may be used.

The chemicals of this invention are useful in the expansion of polymeric gas-expandable materials. They are characterized by relatively high decomposition points (well in excess of 200° C.) and thus are particularly valuable in the formation of cellular plastic articles which are expandable at these relatively high temperatures. The quantity of gas produced by the compounds varies considerably with the nature of the various substituents. Usually the compounds producing the largest amount of gas are the most valuable. However, the decomposition temperature and the nature of the decomposition residue are also factors in the utility of the compounds as blowing agents.

As blowing agents, the chemicals of the invention present a practical departure from the conventional expanding agents most widely employed in the production of cellular rubber and plastics. Nitrogen gas is the major component in the gases produced by azodicarbonamide, a widely used blowing agent. Similarly, other commercial blowing agents produce nitrogen as the major component of the expanding gas:

Azodicarbonamide-Nitrogen (62%), Carbon Monoxide (35%)
Carbon Dioxide and Ammonia (total - 3%)
p,p'-Oxybis(benzenesulfonyl hydrazide)-100% Nitrogen
Dinitroso pentamethylenetetramine-mostly Nitrogen
N,N'-Dinitroso-N,N'-dimethylterephthalamide-100% Nitrogen
p-Toluenesulfonyl semicarbazide-Nitrogen (62%), Carbon dioxide (30%), carbon monoxide (4%) and small amounts of Ammonia In sharp distinction to the blowing agents described above, the N,N'-disubstituted sulfonyl hydrazines of this invention produce relatively minor amounts of nitrogen and larger amounts of carbon dioxide and hydrocarbon gases. Some of the compounds also form gaseous alcohols at the expanding temperatures. This unique combination of gases has been demonstrated to be particularly effective in the expansion of certain plastic polymers and shows advantage over such conventional blowing agents. One outstanding feature of the N,N'-disubstituted sulfonyl hydrazines is the absence of ammonia in the decomposition gases. Ammonia is known to produce deleterious effects in some expandable plastics. In any case, the disubstituted sulfonyl hydrazines of this invention are particularly valuable in the expansion of plastics requiring processing temperature well in excess of 200° C.

The polymeric materials which may be expanded by these blowing agents include homopolymers, interpolymers, graft polymers, and mixtures and blends of two or more of these, and include thermoplastic, thermosetting, and rubbery polymers. The new blowing agents are useful for expanding polymers that have high processing temperatures such as the polycarbonates, phenylene oxide-based resins, polyaryl sulfones, the various nylons, polyesters, certain polystyrenes, polypropylene, poly(styrene-acrylonitrile), polyacetals, poly(vinyl chloride), poly(vinyl acetate), poly(phenylene sulfide), poly(methylpentene), low and high density polyethylenes, polyimides, polyaryl ethers, ABS polymers, polyacrylics, cellulosic polymers, halogenated polymers, especially the fluoroplastics, poly(ethylene-vinyl acetate), and polymer alloys. Other polymers include poly(butadiene-styrene), polyisoprene (including natural rubber), cis- or transpolybutadiene, butyl rubber, ethylene-propylene copolymers, ethylene-propylene-non-conjugated diene terpolymers, and poly(butadiene-acrylonitrile).

Generally, the amount of blowing agent used will depend on the nature of the polymer to be expanded, and the desired density of the foam to be produced. Usually, 0.05 to 15, and most often, 0.2 to 5.0 parts of blowing agent are employed, based on 100 parts of polymer by weight. The blowing agents can be used alone, or in combination with other blowing agents.

Activating substances can be used to increase the efficiency of gas evolution, or to lower the normal decomposition temperature of the blowing agents of the invention. Other additives such as plasticizers, fillers, nucleating agents, and the like can also be added to the polymer to be expanded.

The following examples illustrate the preparation of some of the N,N'-disubstituted sulfonyl hydrazines of the invention, their efficiency as gas producing agents upon decomposition, and their use as blowing agents for producing expanded materials.

EXAMPLE 1

Preparation of 1-Benzenesulfonyl-1,2-dicarbisopropoxy hydrazine according to Method I (a) Preparation of sodium benzenesulfinate Into a 3-liter beaker (equipped with a mechanical stirrer, thermometer, and pH meter electrodes) are introduced 126 g (1.0 mole) of sodium sulfite and 1000 ml water. The mixture is stirred as 176.6 g (1.0 mole) of benzenesulfonyl chloride is added. The pH drops slowly, and is then maintained at about 7 to 8 by addition of a sodium hydroxide (80 g) in water (500 ml) solution. Once the pH stabilizes it is raised to 10. The resulting solution (containing 1.0 mole of sodium benzenesulfinate) is divided into two equal portions, and one of which is employed in (b) below.

(b) Reaction of sodium benzenesulfinate with diisopropyl azodicarboxylate.

To one-half mole of sodium benzenesulfinate in water in a 2 liter beaker is introduced 49 g (0.5 mole) of concentrated sulfuric acid. To the resulting suspension of benzenesulfinic acid is then added 101 g (0.5 mole) of diisopropyl azodicarboxylate. The mixture is stirred and heated to 60° C. (30 minutes). The yellow color of the azo ester gradually disappears. The oily product is extracted with benzene and separated from the lower aqueous layer. Removal of the benzene by evaporation leaves a clear oil which crystallizes when introduced into an 80/20 hexane/benzene mixture. The filtered crystals are dried at 60° C.

Yield = 153 g (89% of theory). mp 98°–101° C. The product decomposes to yield 218.4 cc gas per gram when heated to 265° C.

|   | | Calculated for $C_{14}H_{26}N_2O_6S$ | Found |
|---|---|---|---|
| % | C | 48.83 | 48.94 |
|   | H | 5.81 | 5.92 |
|   | N | 8.13 | 8.16 |
|   | S | 9.30 | 9.55 |

EXAMPLES 2–17

The basic procedure of Example 1 using Method I to make the dicarboxylic derivatives is repeated to produce numerous compounds within the scope of this invention. The results are summarized in Table I.

TABLE I

N,N'-Disubstituted Sulfonyl Hydrazines Prepared by Method I

| | Starting Materials | | | | | Gas | Decomp. |
|---|---|---|---|---|---|---|---|
| Example No. | $R(SO_2H)_n$ R | $(NCOOR^3)_2$ $R^3$ | Yield % | m.p. °C. | Gas evolved | amount cc/g | Temp. °C. |
| 2 | $CH_3$ | $i-C_3H_7$ | 68.0 | 101–104 | yes | 332 | 290–340 |
| 3 | $C_6H_5$ | $t-C_4H_9$ | 44.4 | 143–144 | yes | 275 | 200–245 |
| 4 | $p-ClC_6H_4$ | $i-C_3H_7$ | 66.4 | 118–120 | yes | 205 | 300–345 |

TABLE I-continued
N,N'-Disubstituted Sulfonyl Hydrazines Prepared by Method I

| Example No. | Starting Materials R(SO$_2$H)$_n$ R | (NCOOR$^3$)$_2$ R$^3$ | Yield % | m.p. °C. | Gas evolved | Gas amount cc/g | Decomp. Temp. °C. |
|---|---|---|---|---|---|---|---|
| 5 | 2,3,5-Cl$_3$C$_6$H$_2$ | i-C$_3$H$_7$ | 66.7 | 156–158 | yes | 205 | 300–345 |
| 6 | p-CH$_3$C$_6$H$_4$ | CH$_3$ | 92.2 | 108–111 | yes | 115 | 280–340 |
| 7 | p-CH$_3$C$_6$H$_4$ | C$_2$H$_5$ | 72.7 | 108–113 | yes | 111 | 280–340 |
| 8 | p-CH$_3$C$_6$H$_4$ | n-C$_3$H$_7$ | 89.9 | oil* | yes | | |
| 9 | p-CH$_3$C$_6$H$_4$ | i-C$_3$H$_7$ | 95.0 | 125–129 | yes | 205 | 280–340 |
| 10 | p-CH$_3$C$_6$H$_4$ | sec-C$_4$H$_9$ | 88.0 | 93–94 | yes | 172 | 270–330 |
| 11 | p-CH$_3$C$_6$H$_4$ | tert-C$_4$H$_9$ | 51.0 | 142–143 | yes | 260 | 200–245 |
| 12 | p-CH$_3$C$_6$H$_4$ | C$_2$H$_5$/i-C$_3$H$_7$ | 91.9 | 117–121 | yes | | |
| 13 | 1,4-C$_4$H$_8$—i-C$_3$H$_7$ | | 71.9 | 171–172 | yes | 192 | 250 |
| 14 | 1,3-(CH$_3$)$_2$C$_6$H$_2$-4,6- | i-C$_3$H$_7$ | 81.5 | 168–171 | yes | 248 | 265 |
| 15 | 4,4'-C$_6$H$_4$—C$_6$H$_4$ | n-C$_3$H$_7$ | 98 | 159–163 | yes | | |
| 16 | 4,4'-C$_6$H$_4$—C$_6$H$_4$ | i-C$_3$H$_7$ | 84.5 | 195–200 | yes | 240 | 250–315 |
| 17 | 4,4'-C$_6$H$_4$—C$_6$H$_4$ | n-C$_4$H$_9$ | 86.5 | 150–152 | yes | | |

*SpG = 1.2400 n$_D{}^{20}$ = 1.5101

| Example No. | Analysis Calculated | | | | Found | | | |
|---|---|---|---|---|---|---|---|---|
| | C | H | N | S | C | H | N | S |
| 2 | 38.30 | 6.38 | 9.93 | 11.35 | 37.48 | 6.47 | 9.49 | 11.35 |
| 3 | 51.70 | 6.44 | 7.52 | | 51.84 | 6.44 | 7.46 | |
| 4 | 44.38 | 5.02 | 7.40 | | 44.36 | 5.01 | 7.19 | |
| 5 | 37.54 | 3.80 | 6.26 | | 37.29 | 3.83 | 6.15 | |
| 6 | 43.71 | 4.64 | 9.27 | 10.60 | 43.76 | 4.65 | 9.22 | 10.61 |
| 7 | 47.27 | 5.45 | 8.48 | 9.76 | 46.74 | 5.54 | 8.36 | 9.67 |
| 8 | 50.27 | 6.14 | 7.82 | 8.93 | 50.69 | 6.21 | 8.64 | 8.85 |
| 9 | 50.27 | 6.14 | 7.82 | 8.93 | 50.21 | 6.32 | 7.60 | 9.24 |
| 10 | 52.85 | 6.74 | 7.25 | | 52.59 | 6.79 | 7.19 | |
| 11 | 52.85 | 6.72 | 7.25 | | 52.36 | 6.66 | 7.13 | |
| 12 | 48.84 | 5.81 | 8.14 | 9.30 | 49.03 | 5.90 | 7.97 | 9.50 |
| 13 | 40.67 | 6.44 | 9.49 | 10.84 | 39.89 | 6.39 | 9.37 | 10.91 |
| 14 | 45.14 | 5.95 | 8.77 | 10.03 | 45.70 | 6.36 | 8.66 | 9.89 |
| 15 | 48.97 | 5.53 | 8.16 | 9.32 | 48.59 | 5.77 | 7.98 | 8.87 |
| 16 | 48.97 | 5.53 | 8.16 | 9.32 | 48.58 | 5.52 | 7.75 | 9.24 |
| 17 | 51.75 | 6.20 | 7.55 | 8.63 | 51.70 | 6.12 | 7.65 | 8.62 |

EXAMPLE 18

Preparation of 1-p-Toluenesulfonyl-1,2-dicarbisopropoxy hydrazine according to Method II A 3 liter reaction flask is charged with 186 g (1.0 mole) of p-toluenesulfonyl hydrazide, 184 g (2.2 moles) sodium bicarbonate, 30 g (0.25 mole) magnesium sulfate (anhydrous) and 1000 ml tetrahydrofuran. 269.5 g (2.2 moles) of isopropyl chloroformate is added dropwise over one hour as the temperature rises to 50° C. The mixture is stirred and heated to reflux temperature (67° C.) for 4 hours. Then 750 ml xylene is added and the tetrahydrofuran is distilled off. Steam is introduced into the mixture and the xylene is steam-stripped from the mixture, leaving an oily product. The material is taken up in benzene. Benzene is evaporated off and the residue is treated with hexane, whereupon the material crystallizes. The crystals melt at 119°–127° C. A portion is recrystallized from a 75/25 mixture of hexane and benzene and finally from a large amount of hexane. mp = 127°–129° C.

| Analysis | Calc. for C$_{15}$H$_{22}$N$_2$O$_6$S | Found |
|---|---|---|
| % C | 50.27 | 50.26 |
| H | 6.14 | 6.20 |
| N | 7.82 | 7.83 |
| S | 8.94 | 8.94 |

EXAMPLES 19–20

The basic procedure of Example 18 using Method II to make the dicarboxylate derivatives is repeated. The results are summarized in Table II.

TABLE II
N,N'-Disubstituted Sulfonyl Hydrazines Prepared by Method II

| Example No. | Starting Materials R(SO$_2$NHNH$_2$)$_n$ R | R$^3$OCOCl R$^3$ | Yield % | m.p. °C. | Gas evolved | Gas amount cc/g | Decomp. Temp. °C. |
|---|---|---|---|---|---|---|---|
| 19 | C$_6$H$_5$ | i-C$_3$H$_7$ | 81.4 | 101–104 | yes | 229 | 280–340 |
| 20 | 4,4'-C$_6$H$_4$-C$_6$H$_4$ | C$_2$H$_5$ | 92.4 | 219–223 | yes | | |
| 21 | 4,4'-C$_6$H$_4$O-C$_6$H$_4$ | i-C$_3$H$_7$ | 75.0 | 199–200 | yes | 214 | 250–275 |

| Example No. | Analysis Calculated | | | | Found | | | |
|---|---|---|---|---|---|---|---|---|
| | C | H | N | S | C | H | N | S |
| 19 | 48.83 | 5.81 | 8.13 | 9.30 | 48.94 | 5.92 | 8.16 | 9.55 |
| 20 | 45.71 | 4.76 | 8.88 | 10.15 | 45.62 | 4.78 | 8.59 | 10.13 |

EXAMPLE 22

Preparation of 1-p-Toluenesulfonyl-1,2-dicarbisopropoxy hydrazine according to Method III 54.4 g Isopropyl 3-p-toluenesulfonyl carbazate (0.2 mole) suspended in 300 ml water is treated with 8.8 g (0.22 mole) sodium hydroxide pellets in 100 ml water. The resulting solution is filtered from a trace of insoluble material and the filtrate is charged back into the flask. Then 27.0 g (0.22 mole) of isopropyl chloroformate is added and the mixture is stirred for two hours. The temperature increases from 27° to 35° C.

The crystalline product is filtered off, washed with water and dried. Yield=66 g.

A portion of the material is recrystallized from a 75/25 mixture of hexane and benzene. mp=126°–127° C. When mixed with the product prepared as in Example 18 above the melting point is not depressed.

EXAMPLES 23–30

The procedure of Example 22 using Method III is repeated to make the dicarboxylate derivatives as summarized in Table III. This method allows the preparation of mixed esters.

TABLE III
N,N'-Disubstituted Sulfonyl Hydrazines Prepared by Method III

| Example No. | Starting Materials $R(SO_2NHNHCOOR^3)_n$ R | $R^3$ | $R^3OCOCl$ $R^3$ | Yield % | m.p. °C. | Gas evolved | Gas amount | Decomp. Temp. °C. |
|---|---|---|---|---|---|---|---|---|
| 23 | $C_6H_5$ | i-$C_4H_9$ | i-$C_3H_7$ | 92.2 | 75–75 | yes | 182 | 280–330 |
| 24 | $C_6H_5$ | i-$C_4H_9$ | sec-$C_4H_9$ | 84.0 | 83–85 | yes | | |
| 25 | $C_6H_5$ | i-$C_4H_9$ | $C_6H_5$ | 68.2 | 140–142 | yes | | |
| 26 | p-$CH_3C_6H_4$ | $C_2H_5$ | $CH_3$ | 75.2 | 93–94 | yes | | |
| 27 | p-$CH_3C_6H_4$ | $C_2H_5$ | i-$C_3H_7$ | 78.6 | 132–134 | yes | 171 | |
| 28 | p-$CH_3C_6H_4$ | n-$C_3H_7$ | i-$C_3H_7$ | 90.3 | 90–91 | yes | 167 | |
| 29 | p-$CH_3C_6H_4$ | sec-$C_4H_9$ | i-$C_3H_7$ | 91.4 | 83–86 | yes | 182 | |
| 30 | p-$CH_3C_6H_4$ | sec-$C_4H_9$ | $C_6H_5$ | 71.4 | 86–87 | yes | | |

| Example No. | Analysis Calculated | | | | Found | | | |
|---|---|---|---|---|---|---|---|---|
| | C | H | N | S | C | H | N | S |
| 23 | 50.28 | 6.15 | 7.84 | | 50.31 | 6.32 | 7.98 | |
| 24 | 51.60 | 6.44 | 7.52 | | 51.50 | 6.46 | 7.82 | |
| 25 | 55.10 | 5.12 | 7.14 | | 55.31 | 5.19 | 7.14 | |
| 26 | 45.57 | 5.05 | 8.85 | | 45.58 | 5.13 | 8.82 | |
| 27 | 48.90 | 5.81 | 8.14 | 9.32 | 48.87 | 5.73 | 8.03 | 9.32 |
| 28 | 50.05 | 6.11 | 7.84 | 8.97 | 50.05 | 6.08 | 7.67 | 8.78 |
| 29 | 51.70 | 6.44 | 7.81 | | 51.70 | 6.42 | 7.81 | |
| 30 | 56.20 | 5.35 | 6.73 | | 55.39 | 5.61 | 6.85 | |

EXAMPLE 31

Preparation of 1-p-Toluenesulfonyl-1-Carbisopropoxy-2-Carbamyl Hydrazine according to Method IV The reaction is conducted in a 2 liter reaction flask equipped with thermometer, mechanical stirrer, dropping funnel, and an ice-water bath. 400 ml. water is placed in the flask and cooled to 10° C. Then 73.4 g. (0.6 mole) of isopropyl chloroformate is added. The mixture is stirred at 10° C. as a filtered solution of 114.5 g. (0.5 moles) of p-toluenesulfonyl semicarbazide in a mixture of 36.5 g. (0.55 mole) of KOH in 400 ml. of water is dropped in over the period of an hour, keeping the temperature near 10° C. (A small amount (7.5 g.) of caustic insoluble solid is filtered from the p-toluenesultonyl semicarbazide salt solution). The reaction mixture in the flask is stirred for an additional hour as the temperature is allowed to rise to 25° C. (the cooling bath is removed). A heating mantle is applied and the stirred mixture is warmed to 45° C. The warm mixture is then filtered and the white crystalline product washed with water and dried overnight at 60° C. in a circulating hot air oven. Yield 145 g. (98.4%). m.p. 210°–212° C. A sample is treated with concentrated ammonium hydroxide, washed with water and dried. m.p.=211°–213° C.

| Analysis % | Calc. for $C_{12}H_{17}N_3O_5C$ | Found |
|---|---|---|
| C | 45.72 | 45.64 |
| H | 5.40 | 5.27 |
| N | 13.33 | 12.71 |

TABLE IV

N,N'-Disubstituted Sulfonyl Hydrazines Prepared by Method IV

| Example No. | Starting Materials R(SO₂NHNHCONHR⁴) R⁴ | R³OCOCl R³ | Yield % | m.p. °C | Gas evolved | Gas Amount cc/g | Decomp. Temp. °C | Analysis Calculated C | H | N | S | Found C | H | N | S |
|---|---|---|---|---|---|---|---|---|---|---|---|---|---|---|---|
| 32 | CH₃ H | i-C₃H₇ | | 208–210 | yes | | | 30.13 | 5.44 | 17.57 | | 30.05 | 5.52 | 17.27 | |
| 33 | C₆H₅ H | i-C₃H₇ | 76.8 | 192–195 | yes | 198 | 235–330 | 43.85 | 4.98 | 13.95 | 10.63 | 43.50 | 5.06 | 13.71 | 10.58 |
| 34 | C₆H₅ H | CH₂C₆H₄ | 94.7 | 167–168 | yes | | | 51.58 | 4.30 | 12.03 | 9.17 | 51.53 | 4.28 | 11.69 | 9.13 |
| 35 | C₆H₅ H | n-C₃H₇ | 82.5 | 170–173 | yes | 149 | 235–325 | 43.85 | 4.98 | 13.95 | 10.63 | 43.92 | 5.01 | 13.59 | 10.97 |
| 36 | C₆H₅ H | n-C₄H₉ | 79.4 | 133–5 | yes | | | 45.71 | 5.40 | 13.33 | 10.16 | 45.58 | 5.51 | 12.97 | 10.09 |
| 37 | C₆H₅ H | i-C₄H₉ | 87.0 | 168–170 | yes | 122 | 255–310 | 45.71 | 5.40 | 13.33 | 10.16 | 45.52 | 5.37 | 12.99 | 9.93 |
| 38 | C₆H₅ H | sec-C₄H₉ | 8.1 | 164–166 | yes | 184 | 245–320 | 45.71 | 5.40 | 13.33 | 10.16 | 45.46 | 5.37 | 13.04 | 10.04 |
| 39 | C₆H₅ H | 2-(C₂H₅)C₆H₁₂ | | 95–98 | yes | | | 51.75 | 6.74 | 11.32 | 8.63 | 50.98 | 6.75 | 10.81 | 8.62 |
| 40 | p-CH₃C₆H₄ H | —(CH₂)₄— | 98.3 | 215–217 | yes | | | 43.85 | 4.98 | 13.95 | | 43.35 | 5.02 | 13.24 | |
| 41 | p-CH₃C₆H₄ H | CH₃ | 84.3 | 219–221 | yes | 164 | 245–300 | 41.81 | 4.53 | 14.63 | 11.15 | 41.56 | 4.58 | 14.39 | 11.47 |
| 42 | p-CH₃C₆H₄ H | C₂H₅ | 94.7 | 195–197 | yes | 161 | 235–320 | 43.85 | 4.98 | 13.95 | | 43.77 | 5.00 | 13.63 | |
| 43 | p-CH₃C₆H₄ H | n-C₄H₉ | 67.5 | 179–180 | yes | 127 | 225–300 | 45.72 | 5.40 | 13.33 | 10.16 | 45.81 | 5.46 | 13.11 | 10.00 |
| 44 | p-CH₃C₆H₄ H | i-C₄H₉ | 70.8 | 162–163 | yes | | | 47.5 | 5.78 | 12.75 | 9.76 | 46.99 | 5.72 | 12.49 | 8.74 |
| 45 | p-CH₃C₆H₄ H | C₆H₅ | 89.5 | 179–181 | yes | | | 51.58 | 4.20 | 12.02 | | 51.43 | 4.49 | 12.16 | |
| 46 | —(CH₂)₄— | i-C₃H₇ | 92.5 | — | yes | | | 33.33 | 5.46 | 16.67 | | 33.29 | 5.20 | 15.53 | |
| 47 | | C₂H₅ | 74.1 | — | yes | 149 | 245–300 | 36.64 | 4.58 | 16.03 | | 36.18 | 4.39 | 15.55 | |
| 48 | | i-C₃H₇ | 86.2 | — | yes | 204 | 240–280 | 39.13 | 5.07 | 15.22 | | 38.80 | 5.00 | 14.70 | |
| 49 | 1,3-(CH₃)₂C₆H₂-4,6- | n-C₃H₇ | 74.0 | 107–110 | yes | 182 | 240–310 | 42.86 | 4.55 | 13.64 | | 43.17 | 4.89 | 13.29 | |
| 50 | 1,3-(CH₃)₂C₆H₂-4,6- | C₂H₅ | 74.8 | | yes | 146 | 235–310 | 41.96 | 4.20 | 14.69 | | 41.85 | 4.26 | 14.96 | |
| 51 | 4,4'-C₆H₄OC₆H₄ | i-C₃H₇ | 62.1 | | yes | 184 | 245–325 | 44.00 | 4.67 | 14.33 | | 43.97 | 4.83 | 13.4 | |
| 52 | 4,4'-C₆H₄—C₆H₄ | C₂H₅ | 83 | 114–116 | yes | 170 | 235–310 | 47.42 | 5.78 | 12.77 | | 47.51 | 5.76 | 12.57 | |
| 53 | " C₆H₅ | i-C₃H₇ | 91 | 128–130 | yes | 130 | 235–310 | 47.42 | 5.78 | 12.77 | | 47.36 | 5.66 | 12.59 | |
| 54 | " | n-C₃H₇ | 81.6 | 149–150 | yes | | | 48.98 | 6.12 | 12.24 | | 48.89 | 6.10 | 12.08 | |
| 55 | " | i-C₄H₉ | 35.1 | 87–90 | yes | | | 54.14 | 7.27 | 10.53 | | 53.56 | 7.25 | 10.45 | |
| 56 | p-CH₃C₆H₄ CH₃ | 2-(C₂H₅)C₆H₁₂ | 54.2 | 183–185 | yes | 135 | 225–310 | 43.85 | 4.98 | 13.95 | | 43.52 | 5.03 | 13.62 | |
| 57 | CH₃ | CH₃ | 87.3 | 190–193 | yes | 155 | 250–350 | 45.71 | 5.40 | 13.33 | | 45.63 | 5.29 | 13.20 | |
| 58 | C₆H₅ CH₃ | C₂H₅ | 87 | 197–200 | yes | | 245 | 55.24 | 5.37 | 10.74 | | 55.13 | 5.40 | 10.67 | |
| 59 | 1,3-(CH₃)₂C₆H₂-4,6- C₂H₅ | i-C₃H₇ | 75.8 | | yes | 137 | 210–250 | 41.38 | 5.52 | 14.48 | | 42.02 | 5.51 | 13.48 | |
| 60 | 4,4'-C₆H₄OC₆H₄ C₂H₅ | CH₃ | 87.8 | | yes | 137 | 245–310 | 43.28 | 4.55 | 13.64 | | 43.28 | 4.90 | 13.04 | |
| 61 | " C₂H₅ | C₂H₅ | 87.4 | 175–180 | yes | 171 | 210–250 | 44.72 | 4.97 | 13.04 | | 45.40 | 5.08 | 13.04 | |
| 62 | " C₂H₅ | i-C₃H₇ | 90.9 | 186–190 | yes | | | 51.81 | 5.29 | 11.70 | | 52.06 | 5.24 | 12.64 | |
| 63 | " C₂H₅ | i-C₄H₉ | 98.3 | 145–148 | yes | 141 | 230–300 | 46.00 | 5.71 | 12.00 | | 47.96 | 5.79 | 11.46 | |
| 64 | p-CH₃C₆H₄ C₂H₅ | C₂H₅ | 91.3 | | yes | | | 50.43 | 4.93 | 12.17 | | 50.22 | 4.79 | 11.62 | |
| 65 |  " | i-C₃H₇ | 94.7 | 131–134 | yes | 171 | 245–310 | 51.81 | 5.29 | 11.70 | | 52.06 | 5.24 | 11.46 | |

EXAMPLE 66

Preparation of 1-Benzenesulfonyl-1-methylcarbamyl-2-carbethoxy hydrazine according to Method V A solution of 61 g (0.25 mole) of ethyl benzenesulfonyl carbazate in 500 ml benzene was stirred at 60° C. in a 2 liter reaction flask as 16 g (0.275 mole) of methyl isocyanate was added over 10 minutes. The mixture was heated to reflux (80° C. for one hour). The mixture was cooled and the separated crystalline solid was filtered and dried. Yield=62 g, mp 138°–142° C. A portion recrystallized from benzene melted at 141°–143° C.

| Analysis: | Calc. for $C_{11}H_{15}N_3O_5S$ | Found |
|---|---|---|
| %C | 43.85 | 43.20 |
| %H | 4.98 | 4.96 |
| %N | 13.95 | 13.55 |

EXAMPLES 67–69

The basic procedure of Example 66 is repeated to produce other compounds in accordance with Method V and to test the amount of gas evolved therefrom. The results are summarized in Table V.

TABLE V

| | Starting Materials | | | | | Gas Amount |
|---|---|---|---|---|---|---|
| | $RSO_2NHNHCOOR^3$ | | $R^4NCO$ | Yield | m.p. | Gas | at 265° C., |
| Example No. | R= | $R^3=$ | $R^4=$ | % | °C. | Evolved | cc/5 |
| 67 | p-$CH_3C_6H_4$ | $C_2H_5$ | $CH_3$ | 91.1 | 153–155 | Yes | 167.8 |
| 68 | $C_6H_5$ | i-$C_3H_7$ | $CH_3$ | 89.2 | 157–160 | Yes | 152.8 |
| 69 | $C_6H_5$ | i-$C_3H_7$ | $C_2H_5$ | 80.9 | 141–143 | Yes | 175.5 |

| | Analysis | | | | | |
|---|---|---|---|---|---|---|
| | Calculated | | | Found | | |
| Example No. | C | H | N | C | H | N |
| 67 | 45.71 | 5.40 | 13.33 | 45.76 | 5.45 | 13.05 |
| 68 | 45.71 | 5.40 | 13.33 | 45.79 | 5.50 | 13.09 |

EXAMPLE 70

Preparation of 1-Benzenesulfonyl-1-ethylcarbamyl-2-carbisopropoxy hydrazine according to Method VI A solution of 16.4 g (0.1 mole) sodium benzenesulfinate in 300 ml water in a 500 ml flask was treated with 4.9 g (0.05 mole) conc. sulfuric acid. The resulting suspension of benzenesulfinic acid was stirred and warmed to 60° C. as 18.7 g (0.1 mole) of 1 carbisoproposy-2-N-ethyl-carbamyl diimide was added all at once. It was stirred for 15 minutes as the orange color of the diimide was completely discharged. The oily product was then extracted with benzene and dried over sodium sulfate. The benzene was evaporated and the oily residue then crystallized. Yield=29 g, m.p. 110°–122° C.

When recrystallized from 80/20 methanol/water the product (17 g) melted at 127°–133° C. The second recrystallization from 80/20 methanol/water gave a metling point of 132°–134° C.

| Analysis: | Calc. for $C_{13}H_{19}N_3O_5S$ | Found |
|---|---|---|
| %C | 47.42 | 46.97 |
| H | 5.28 | 5.60 |
| NH | 12.77 | 12.42 |

This product evolved 137.7 cc/g of gas at 265° C.

A second product (6 g.) was isolated from the recovered filtrates which melted at 106°–11° C. This product proved to be identical to the product prepared by reacting 1-benzenesulfonyl-2-N-ethylcarbamyl hydrazine with isopropyl chloroformate according to Method IV.

EXAMPLE 71

Preparation of 1-p-Toluenesulfonyl-1,2-diisopropylcarbamyl hydrazine according to Method VII To a 1-liter Erlenmeyer flask is added 20.0 grams (0.1 mole) of N,N'-diisopropylazodicarbonamide and 18.8 g (0.05 mole) zinc p-toluenesulfinate. To the mixture is added 5.0 g. concentrated sulfuric acid in 800 ml. water.

The reaction mixture is stirred overnight and is filtered, washed, and dried. The compound melted at 178°–179° C. after recrystallization from methanol.

EXAMPLES 72–75

The basic procedure of Example 71 is repeated to produce other compounds according to Method VII and to test the amount of gas evolved therefrom. The results are summarized in Table VI.

TABLE VI

| | N,N'-Disubstituted Sulfonyl Hydrazines Prepared by Method VII | | | | | | |
|---|---|---|---|---|---|---|---|
| Example No. | $R^4HNCONNCONHR^4$ $R^4$ | $R(SO_2)_n$ R | Yield % | m.p. °C. | Gas Evolved | Gas amount cc/g | Decomp. Temp. °C. |
| 72 | H | p-$CH_3C_6H_4$ | 92 | 226–228 (decomp.) | yes | 161 | |
| 73 | $CH_3$ | " | 82 | 186–188 | yes | | |
| 74 | i-$C_3H_7$ | " | 90 | 178–179 | yes | 111 | 205–265 |
| 75 | cyclo $C_6H_{11}$ | " | 96.5 | 169–171 | yes | | |

| | Analysis | | | | | | | |
|---|---|---|---|---|---|---|---|---|
| Example No. | Calculated | | | | Found | | | |
| | C | H | N | S | C | H | N | S |
| 72 | 39.70 | 4.41 | 20.58 | 11.76 | 39.27 | 4.41 | 21.20 | 11.60 |
| 73 | 44.1 | 5.35 | 18.6 | | 44.02 | 5.39 | 18.00 | |

EXAMPLE 76

Expansion of Polysulfone Polymer

Polysulfone pellets are pre-dried by heating at 250° F. for three hours. The pellets are then coated with 1% by weight of the blowing agent being tested by thoroughly mixing the resin and the blowing agent in a glass jar. The uniformly coated pellets are introduced into a preheated laboratory extruder where the temperature in ° F. are: rear - 540, front - 580, die - 530; and the screw RPM's are 30; and the stock temperature is as shown in Table VI. The specific gravity of the unexpanded polysulfone resin is 1.2360. The temperature profile varies some with the several blowing agents.

Table VII
Results of Example 76

| Blowing Agent | Stock Temp. °F. | Specific Gravity |
|---|---|---|
| 1-p-Toluenesulfonyl-1,2-dicarbisopropoxy hydrazine | 540 | 0.6249 |
| 1-p-Toluenesulfonyl-1-carbethoxy-2-carbisopropoxy hydrazine | 580 | 0.9100 |
| 1-Methanesulfonyl-1,2-di-carbisopropoxy hydrazine | 590 | 0.6935 |
| 1-Benzenesulfonyl-1,2-di-carbisopropoxy hydrazine | 530 | 0.7673 |
| 1,4-Butanebis(1-sulfonyl-1,2-dicarbisopropoxy hydrazine) | 590 | 0.8300 |
| 4,4'-Biphenylenebis(1-sulfonyl-1,2-dicarbisopropoxy hydrazine) | 590 | 0.6305 |
| 4,4'-Biphenylenebis(1-sulfonyl-1,2-dicarbo-n-butoxy hydrazine) | 520 | 1.1323 |
| p,p'-oxybis(1-benzenesulfonyl-1,2-dicarbisopropoxy hydrazine) | 540 | 0.7326 |

EXAMPLE 77

Expansion of Polysulfone Polymer

The procedure of Example 76 is repeated with a different polysulfone polymer having a specific gravity of 1.22946. The extruder temperatures and speeds are:
Rear—520° F.
Front—580° F.
Die—560° F.
Speed—30 RPM The results and the stock temperature are summarized in Table VIII.

Table VIII
Results of Example 77

| Blowing Agent | Stock Temp. °F. | Specific Gravity |
|---|---|---|
| 1-p-Toluenesulfonyl-1-carbo-n-propoxy-2-carbamyl hydrazine | 575 | 0.67217 |
| 1-Benzenesulfonyl-1-carbobenzyloxy-2-carbamyl hydrazine | 565 | 0.66975 |
| 1-p-Toluenesulfonyl-1-carbethoxy-2-carbamyl hydrazine | 565 | 0.67634 |
| 1,3-Dimethylbenzene-4,6-bis(1-sulfonyl-1-carbisopropoxy-2-carbamyl hydrazine | 575 | 0.64755 |
| 1-Benzenesulfonyl-1-carbisopropoxy-2-carbamyl hydrazine | 560 | 0.65562 |
| 1-Benzenesulfonyl-1-carbo-sec-butoxy-2-carbamyl hydrazine | 565 | 0.62940 |
| 1-Benzenesulfonyl-1-carbisobutoxy-2-carbamyl hydrazine | 550 | 0.66635 |
| 1-Benzenesulfonyl-1-carbo-n-propoxy-2-carbamyl hydrazine | 550 | 0.68899 |
| 1-Benzenesulfonyl-1-carbo-n-butoxy-2-carbamyl hydrazine | 560 | 0.71144 |
| 1-p-Toluenesulfonyl-1-carbo-methoxy-2-carbamyl hydrazine | 565 | 0.68848 |
| 1,4-Butylenebis(1-p-toluenesulfonyl-1-oxycarbonyl-2-carbamyl hydrazine) | 570 | 0.70859 |
| 4,4'-Biphenylenebis(1-sulfonyl-1-carbethoxy-2-carbamyl hydrazine) | 550 | 0.70613 |
| 1,3-Dimethylbenzene-4,6-bis(1-sulfonyl-1-carbethoxy-2-carbamyl hydrazine) | 570 | 0.71102 |

EXAMPLE 78

Expansion of Polysulfone Polymer

The procedure of Example 77 is repeated with a third polysulfone having a specific gravity of 1.1167. The extruder temperatures and speeds are the same as in Example 77. The results are shown below in Table IX.

Table IX
Results of Example 78

| Blowing Agent | Stock Temp. °F. | Specific Gravity |
|---|---|---|
| 1-Benzenesulfonyl-1-carbisopropoxy-2-ethylcarbamyl hydrazine | 570 | 0.7089 |
| 1-p-Toluenesulfonyl-1-carbisopropoxy-2-phenylcarbamyl hydrazine | 570 | 0.6822 |
| 1-p-Toluenesulfonyl-1-carbisopropoxy-2-methylcarbamyl hydrazine | 570 | 0.7300 |
| p,p'-oxybis(1-benzenesulfonyl-1-carbisopropoxy-2-ethylcarbamyl hydrazine) | 580 | 0.6944 |

EXAMPLE 79

Expansion of Polysulfone Polymer

The procedure of Example 76 is repeated with a fourth polysulfone having a specific gravity of 1.2440. The extruder temperature and speeds are the same as in Example 76. The results are shown below in Table X.

Table X
Results of Example 79

| Blowing Agent | Stock Temp. °F. | Specific Gravity |
| --- | --- | --- |
| 1-Benzenesulfonyl-1-ethylcarbamyl-2-carbisopropoxy hydrazine | 550 | 0.5629 |
| 1-p-Toluenesulfonyl-1-methylcarbamyl-2-carbethoxy hydrazine | 550 | 0.6662 |
| 1-Benzenesulfonyl-1-methylcarbamyl-2-carbethoxy hydrazine | 555 | 0.6806 |
| 1-Benzenesulfonyl-1-methylcarbamyl-2-carbisopropoxy hydrazine | 550 | 0.7286 |

EXAMPLE 80

Expansion of Glass-Filled Polyester Resin

The following blowing agents are combined (0.3–0.4% as indicated) with glass filled polyester resin (Valoz 650) (pre-dried at 250° F.) and injection molded in a 5 oz. Netri-Rossi injection molding machine using a $4\frac{1}{2}'' \times 4\frac{1}{2}'' \times \frac{1}{4}''$ plaque cavity mold. In this work each of the blowing agent-polymer blends is molded under identical machine conditions.

The temperatures of the machine are 440° F. at the rear, middle, and front thereof. The mold is at 175° F.

The results are as below:

| Blowing Agent | Amount % | Weight of Part |
| --- | --- | --- |
| 1,3-Dimethylbenzene-4,6-(1-sulfonyl-1-carbisopropoxy-2-carbamyl hydrazine) | 0.3 | 102 |
| 1-p-Toluenesulfonyl-1-carbomethoxy-2-carbamyl hydrazine | 0.4 | 102 |
| None | — | 144 |

Thus each sample shows a 29% expansion of the molded part.

What is claimed is:

1. An N,N'-disubstituted sulfonyl hydrazine having the formula $$R(SO_2NR^1NHR^2)_n.$$

wherein R is a $C_1$-$C_{12}$ alkyl radical, a $C_6$-$C_{12}$ aryl radical, a $C_7$-$C_{12}$ aralkyl or alkaryl radical, a $C_5$-$C_9$ cycloalkyl radical or a group of the structure —$R^5$—A—$R^6$- wherein A is (1) a single bond connecting $R^5$ and $R^6$, (2) —O—, (3) —S—, (4) —SO—, (5) —SO$_2$—, (6) a $C_1$-$C_6$ alkylene or (7) a $C_2$-$C_3$ alkylidene and $R^5$ and $R^6$ are each independently selected from the group consisting of $C_1$-$C_4$ alkylene and phenylene; $R^1$ and $R^2$ are each —COOR$^3$; $R^3$ is a $C_1$—$C_{12}$ alkyl, a $C_5$-$C_9$ cycloalkyl, a $C_6$-$C_{12}$ aryl, or a $C_7$-$C_{12}$ alkaryl or aralkyl radical; and n is 1 or 2.

2. The sulfonyl hydrazine of claim 1 wherein R is a radical selected from alkyl with 1 to 4 carbon atoms, aryl with 6 to 10 carbon atoms, aralkyl with 7 to 9 carbon atoms, alkaryl with 7 to 8 carbon atoms, cycloalkyl with 5 to 6 carbon atoms, and a group of the formula —$R^5$—A—$R^6$— wherein A is a single bond connecting $R^5$ and $R^6$ or —O—, and wherein $R^5$ and $R^6$ are the same or different and are alkylene with 1 to 4 carbon atoms or phenylene.

3. The sulfonyl hydrazine of claim 1 wherein $R^3$ is a radical selected from alkyl with 1 to 8 carbon atoms, alkylene with 2 to 6 carbon atoms, cycloalkyl with 5 to 6 carbon atoms, aryl with 6 to 10 carbon atoms, alkaryl with 7 to 9 carbon atoms, and aralkyl with 7 to 8 carbon atoms.

4. The sulfonyl hydrazine of claim 1 wherein $R^3$ is selected from the group consisting of isopropyl, sec-butyl, tert-butyl, cyclohexyl, benzyl, phenyl, and tolyl.

5. The sulfonyl hydrazine of claim 1 wherein the $R^3$ radicals are the same and are selected from isopropyl, sec-butyl, and tert-butyl.

6. The sulfonyl hydrazine of claim 1 wherein the $R^3$ radicals are different and are each selected from isopropyl, sec-butyl, and tert-butyl.

* * * * *